US011373210B2

(12) United States Patent
Kumbi et al.

(10) Patent No.: US 11,373,210 B2
(45) Date of Patent: Jun. 28, 2022

(54) CONTENT INTEREST FROM INTERACTION INFORMATION

(71) Applicant: Adobe Inc., San Jose, CA (US)

(72) Inventors: Niranjan Shivanand Kumbi, Fremont, CA (US); Ajay Awatramani, Fremont, CA (US); Balaji Vasan Srinivasan, Bangalore (IN); Reddy Sreekanth, Visakhapatnam (IN); Niyati Himanshu Chhaya, Hyderabad (IN)

(73) Assignee: Adobe Inc., San Jose, CA (US)

( * ) Notice: Subject to any disclaimer, the term of this patent is extended or adjusted under 35 U.S.C. 154(b) by 275 days.

(21) Appl. No.: 16/830,886

(22) Filed: Mar. 26, 2020

(65) Prior Publication Data
US 2021/0304253 A1    Sep. 30, 2021

(51) Int. Cl.
*G06F 40/279* (2020.01)
*G06Q 30/02* (2012.01)
*G06F 40/30* (2020.01)

(52) U.S. Cl.
CPC ....... *G06Q 30/0263* (2013.01); *G06F 40/279* (2020.01); *G06F 40/30* (2020.01)

(58) Field of Classification Search
CPC ...... G06F 16/313; G06F 16/322; G06F 16/36; G06F 40/279; G06F 40/284; G06F 40/30; G06Q 30/0251; G06Q 30/0254; G06Q 30/0255; G06Q 30/0269

USPC .............. 704/1, 9; 705/14.49, 14.52, 14.53; 707/736, 738, 739, 749, 750
See application file for complete search history.

(56) References Cited

U.S. PATENT DOCUMENTS

| | | | |
|---|---|---|---|
| 10,068,022 B2 * | 9/2018 | Pilpel | G06F 16/9024 |
| 10,459,950 B2 * | 10/2019 | Pasternack | G06F 16/2228 |
| 10,521,824 B1 * | 12/2019 | Boshy | G06Q 30/0269 |
| 2010/0049770 A1 * | 2/2010 | Ismalon | G06Q 30/0269 707/765 |
| 2013/0325769 A1 * | 12/2013 | Downs | G06F 40/258 706/18 |
| 2014/0316850 A1 * | 10/2014 | Peechara | G06Q 30/0282 705/7.29 |
| 2017/0178184 A1 * | 6/2017 | Brill | G06Q 30/0255 |
| 2018/0336202 A1 * | 11/2018 | Jahanbakhsh | G06F 16/9535 |
| 2020/0008008 A1 * | 1/2020 | Zhang | G06F 16/90324 |
| 2020/0213408 A1 * | 7/2020 | Gao | G06F 16/9535 |
| 2021/0209500 A1 * | 7/2021 | Hu | G06F 40/30 |

* cited by examiner

*Primary Examiner* — Martin Lerner
(74) *Attorney, Agent, or Firm* — FIG. 1 Patents (57) ABSTRACT

Techniques and systems are described for content interest from interaction information. Keywords are extracted from digital content, and relevance values are determined based on the keywords that captures both the statistical and semantic significance of topics in the digital content through use of a network representation. Interest values for an entity are determined based on the relevance values and an interaction dataset, which capture both the statistical and semantic significance of the topics with respect to the entity. The interest values may be utilized to control output of digital content to a client device.

20 Claims, 7 Drawing Sheets

CONTENT INTEREST FROM INTERACTION INFORMATION

BACKGROUND

Analytics systems are configured to identify patterns in vast quantities of data, and from these patterns, gain insights that are not possible to be made by a human alone. Analytics systems, for instance, may be configured to provision network and computational resources of service provider systems, control output of digital content (e.g., recommendations and digital marketing content), and so forth. To do so, analytics systems are tasked with analyzing vast quantities of data (e.g., petabytes) that may be obtained from a diverse range of sources.

Conventional techniques used to collect this data may collect data involving user interactions with digital content using a respective computing device. Business to business marketers, for instance, utilize analytics systems in an attempt to progress potential sales leads through a marketing funnel and to decrease a cost per lead. Conventional analytics systems, however, rely on manual rule-based techniques to extract relevant information from the data, and often involve manual classification of assets and programs with arbitrary, inconsistent, and inaccurate labels. A page of a website, for instance, may be manually tagged with information that represents the content of the particular page. When a computing device associated with a sales lead accesses the page, this information is then associated with the sales lead to represent that the sales lead is interested in those tags. However, manually tagging the content of every page of a website is hard to maintain for large websites, websites with dynamic content, and so forth. Further, the majority of contextual data is not collected from the page, as manual tags typically contain only a small set of arbitrarily decided topics. This limits performance of the conventional techniques in that the amount of context is limited and thus limits the accuracy of digital analytic systems over time, thereby resulting in inefficient use of computing resources and thus inefficient operation of a computing device that implements conventional analytic systems.

SUMMARY

Techniques and systems are described for content interest from interaction information. In one example, analytics systems are configured to perform techniques to determine content interest, automatically and without user intervention, by extracting topics from digital content and creating network representations that extract insights from an interaction dataset collected by the analytics system and describing interaction with the digital content. This permits the analytics system to address interactions between topics associated with the interaction dataset in ways that are not possible using conventional techniques for determining user interest.

To do so, the content interest system employs an interaction dataset to identify digital content and extracts keywords from the digital content. Relevance values are determined based on the keywords that capture both the statistical significance and semantic significance of topics in the digital content by creating a network representation with nodes corresponding to keywords identified in the digital content and edges corresponding to a semantic similarity between keywords. The relevance values are combined with interaction weights for the types of interactions described within the interaction dataset, and interest values are generated for an entity described in the interaction dataset. To do so, the content interest system creates another network representation with nodes corresponding to interaction scores for topics and edges corresponding to a semantic similarity between topics. The content interest system uses this network representation to determine a combined interest value in a topic that incorporates both the statistical importance and the semantic significance of the topic with respect to the entity.

The interest values may be utilized in a variety of ways, such as to identify an audience with particular interests or to perform content analysis upon the entity to determine products or assets that the entity may be interested in, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Analytics systems attempt to determine users' interest in content, such as for use in recommending content to a user. However, conventional analytics systems are limited to manual information tags representing the subject matter of digital content, and further are typically configured for use in business-to-consumer interactions. For example, business-to-consumer interactions typically involve no more than making a consumer aware that a product or service exists along with a price for the product or service, and conversion often occurs after a single interaction. In contrast, business-to-business marketing is a prolonged effort involving many interactions at various stages of involvement, such as through a sales pipeline involving marketing qualified leads, sales accepted leads, and sales qualified leads. In business-to-business interactions, a selling party attempts to discern the current needs of a buying party in order to tailor communications to help move the buying party through the sales pipeline. For instance, a sales development representative (SDR) may provide various assets to the buying party, such as assets pertaining to emails, events, webinars, tradeshows, and so forth. Based on a buying party's interaction with these assets, the SDR attempts to evaluate an interest in the asset and apply that interest to personalize a campaign for a particular product. With the advent of digital communications, ever-increasing amounts of interaction data is collected, while conventional techniques to harvest insights from this interaction data require manual tags and rule-based structures that cannot accommodate large amounts of information, require large amounts of a user's time, and provide inconsistent and inaccurate results.

Accordingly, analytics system content interest from interaction information techniques and systems are described that overcome the challenges and inaccuracies of conventional techniques. In one example, analytics systems are configured to determine content interest, automatically and without user intervention, by extracting topics from digital content and creating network representations that extract insights from an interaction dataset collected by the analytics system and describing interaction with the digital content. This permits the analytics system to address interactions between topics associated with the interaction dataset in ways that are not possible using conventional techniques for determining user interest.

Nodes, for instance, may be generated from a dataset to describe topics within the digital content. Digital content is identified based on the interaction dataset, and information contained in the digital content is contextualized to extract a set of keywords with relevance to the digital content. A node is created for each keyword, and may be initialized with a weighted value indicating a relative importance or significance of the keyword with respect to the digital content (e.g., signifying a statistical significance of the keyword). The digital analytics system described herein determines an amount of semantic similarity between nodes, and initializes edges between nodes with a value indicating the amount of semantic similarity. The amount of semantic similarity enables the digital analytics system to determine a semantic significance of a keyword with respect to the digital content.

The analytics system uses this network representation to determine a combined relevance value for a topic, incorporating both the statistical significance and the semantic significance of the topic with respect to the digital content. This allows the analytics system to automatically provide a list of relevant topics for an item of digital content, with increased accuracy and efficiency than is possible through conventional techniques. This allows techniques that rely on accurate topic extraction to also realized increased accuracy, e.g., network and computational resource provisioning, generation and control of digital content to make recommendations and control dissemination of digital marketing content, and so forth.

The analytics system employs the determined relevance values as part of determining a particular user's interest in a topic. For a particular topic, the analytics system determines, from the interaction dataset, specific interactions that the user has had with digital content associated with the topic. An interaction score is assigned for the topic based on the combination of specific interactions and relevance values for the digital content associated with the specific interactions. Another network representation is created that determines the user's interest in the topic, incorporating both a statistical significance of the topic and a semantic significance of the topic with respect to the user. Nodes may be generated to describe topics, and initialized with the interaction scores for the topics (e.g., describing a statistical significance). Edges are created between the nodes and initialized with a value describing an amount of semantic similarity between the nodes. The analytics system uses this network representation to determine a combined interest value in a topic, incorporating both the statistical significance and the semantic significance of the topic with respect to the user.

The interest values may be utilized in a variety of ways, such as to identify an audience with particular interests, perform content analysis upon the user to determine particular products or assets that the user may be interested in, and so forth. As a result, business-to-business interactions are provided with more accurate and dynamic interests with respect to individual users, and operational efficiency is improved for computing devices employing business-to-business techniques. This allows techniques that rely on determining an user's interests to also realize increased accuracy, e.g., network and computational resource provisioning, generation and control of digital content to make recommendations and control dissemination of digital marketing content, and so forth.

Further, the systems and techniques described herein provide a number of improvements over conventional techniques. For instance, the content interest from interaction information techniques described herein provide consistent and automatic extraction of topics from digital content, and can capture not only a statistical significance of the topics with respect to the digital content, but also captures a semantic significance of the topics with respect to the digital content. By utilizing a combination of statistical significance and semantic significance, the resultant list of relevant topics provides a higher degree of accuracy compared to conventional techniques. Additionally, this increase in accuracy is compounded by additionally incorporating both a statistical significance of a topic and a semantic significance of a topic with respect to a particular user in determining an interest in the topic with respect to the particular user. Interest information determined in this manner provides functionality that is not present with conventional systems. For instance, the interest information allows for control of digital content at various levels of granularity, offering insight into interest at a user level, a department level, an organization level, for an entire audience, and so forth. Further discussion of these and other examples is included in the following sections.

Term Examples

A "network representation" or "graph" describes a network with a set of nodes and a set of edges connecting the nodes. The nodes and/or the edges of the network may be associated with labels and/or values. Although generally described herein with respect to a word-centric network or an entity-centric network, the nodes may include any suitable types, such as internet entities, humans, neurons, routers, autonomous systems, devices, sensors, economies, vehicles, and so forth.

A "node" represents an entity in a network. For instance, a graph representation of a network may include any number of nodes, each representing a different entity. For example, an entity may include a keyword or topic, such that each respective keyword or topic has a different node. A node may further be associated with a value, e.g. a reward for the node. For example, a node associated with a keyword may have a value associated with the keyword.

An "edge" of a graph represents a connection or relationship between two nodes in the graph, and may also be referred to as a "node association". An edge may further be associated with a value. For example, an edge between nodes associated with keywords may have a value associated with a semantic similarity between the keywords.

A "neighbor" of a node refers to another node that is connected to the node via an edge.

An "asset" refers to any item of digital content. Examples of assets include PDF documents, word processing documents, datasheets, articles, scientific reports, forms, images, videos, webinars, electronic media content, and so forth.

A "statistical significance value" refers to a numerical representation of a word's significance with respect to an item of content in which the word is located. The statistical significance value, for instance, may incorporate an inverse document frequency (IDF) value or a term frequency—inverse document frequency (TFIDF) value that is indicative of the statistical significance of the word.

A "semantic similarity" refers to a representation of a similarity between words. The semantic similarity may be, for instance, a similarity between word-level embeddings corresponding to the words. As an example, the semantic similarity may be the cosine similarity of word-level embeddings.

A "semantic significance value" refers to a numerical representation of the significance of words that are semantically similar to a particular word. The semantic significance value, for instance, may incorporate weighted reward values for all neighbors of a word that weight statistical significance values of the neighbors with corresponding semantic similarities of the neighbors with respect to the particular word.

A "relevance value" refers to a numerical representation of a word's relevance with respect to an item of content in which the word is located. The relevance value is indicative of a combination of the statistical significance of the word and the semantic significance of the word. A "relevance list" refers to a list of words and corresponding relevance values for each word in the list.

"Interaction data" refers to data describing at least one interaction with an item of digital content, such as interaction between a client device and the item of digital content. The interaction data, for instance, includes data identifying the device interacting with the content, data identifying the digital content that was interacted with, and data identifying a type of interaction that took place. The interaction data may describe multiple interactions between the same device and the same item of digital content, may describe multiple interactions between the same device and different items of digital content, and so forth.

An "interaction score" for a topic represents the user's statistical interest in the topic. For instance, a topic is extracted from digital content described in interaction data, relevance values for the topic are weighted based on the interactions described in the interaction data, and the resultant weighted values are aggregated for a topic based on the interaction pattern with the user across multiple interactions with the user.

An "interest value" refers to a numerical representation of an entity's interest with respect to a word or topic, and represents the relevance, significance, or importance of the word or topic to the entity. An interest value may be determined, for instance, based on a user's interaction with an item of digital content and relevance values for the item of digital content, such as by combining the interaction score for a topic with semantic significance value for the topic with respect to interaction scores for other topics.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1:
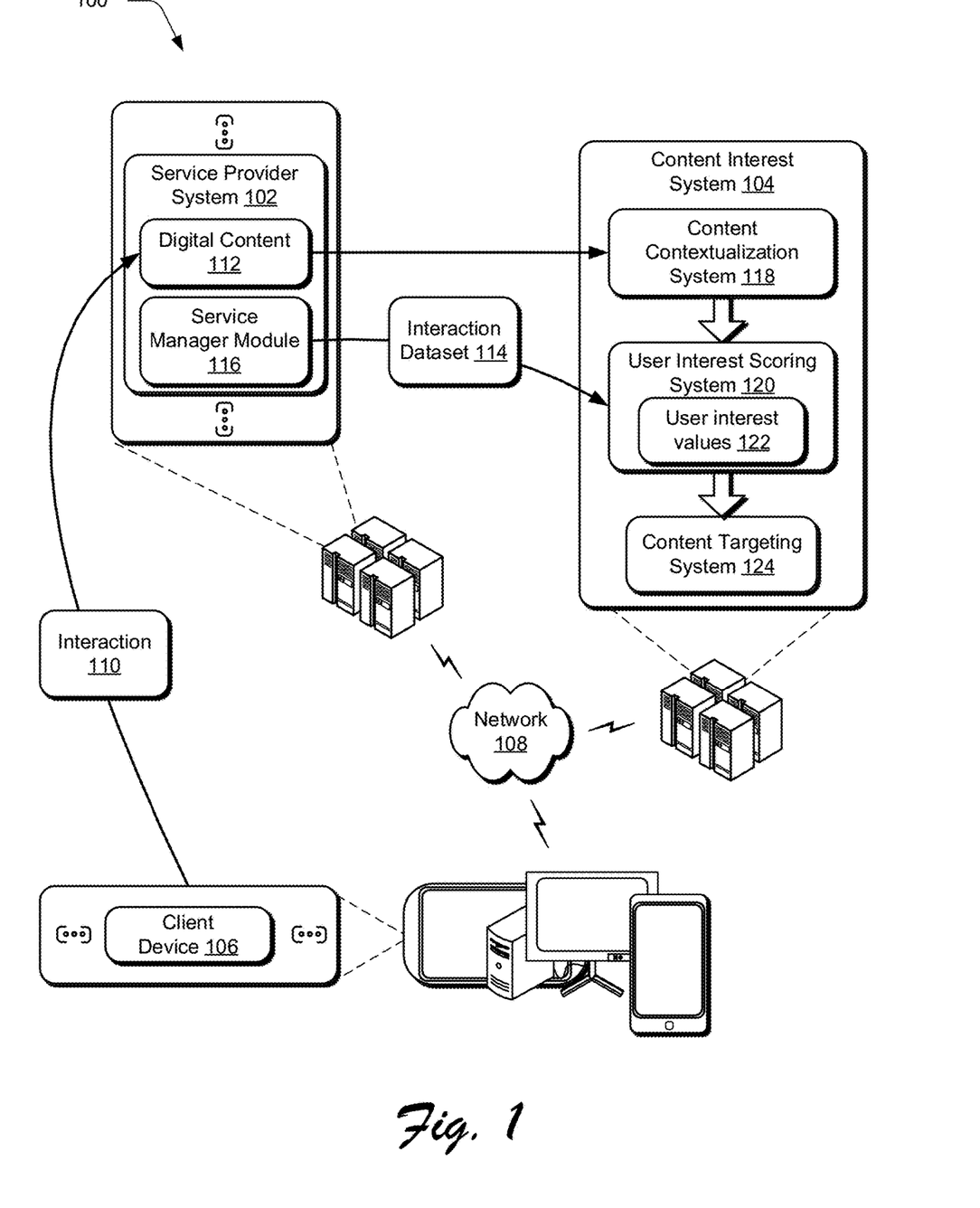
FIG. 1 is an illustration of an environment in an example implementation that is operable to employ content interest from interaction information techniques described herein.

FIG. 1 is an illustration of a digital medium environment 100 in an example implementation that is operable to employ contextual content interest techniques described herein. The illustrated environment 100 includes a service provider system 102, a content interest system 104, and a plurality of client devices, an example of which is illustrated as client device 106. These devices are communicatively coupled, one to another, via a network 108 and may be implemented by a computing device that may assume a wide variety of configurations.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the service provider system 102 and the content interest system 104 and as further described in FIG. 7.

The client device 106 is illustrated as engaging in interaction 110 with the service provider system 102. The service provider system 102, for instance, may be configured to support interaction with digital content 112. As part of this interaction, an interaction dataset 114 is generated (e.g., by a service manager module 116) that describes the interaction 110, characteristics of the interaction 110, event data associated with the interaction 110, and so forth. The service manager module 116 may be a plug-in module for communication with the content interest system 104, such as a JavaScript extension that can be deployed on a webpage, and in some implementations is included as a part of the digital content 112. The digital content 112 may be any type of data that is configured to be rendered for output by an output device of a computing device to a user. Examples of the digital content 112 include digital images, digital audio, digital media, digital video, digital articles, digital text, and so forth.

The digital content 112 may take a variety of forms and thus the interaction 110 with the digital content 112 may also take a variety of forms. For example, a user of the client device 106 interacting with the digital content 112 may read an article, view a digital video, listen to digital music, view posts and messages on a social network system, and so forth. In another example, the digital content 112 is configured as digital marketing content to cause conversion of a good or service, e.g., by "clicking" an ad, purchase of the good or service, and so forth. Digital marketing content may also take a variety of forms, such as electronic messages, email, banner ads, posts, and so forth. Accordingly, digital marketing content is typically employed to raise awareness and conversion of the good or service corresponding to the content. In another example, the interaction 110 and thus generation of the interaction dataset 114 may also occur locally on the client device 106.

The digital content 112 is accessed by a content contextualization system 118 of the content interest system 104. The content contextualization system 118 is configured to extract relevant topics describing the contents of the digital content 112. The interaction dataset 114 is received by a user interest scoring system 120 of the content interest system 104. The user interest scoring system 120 utilizes the interaction dataset 114 to identify the digital content 112 that was interacted with as well as a type of interaction that occurred in order to generate user interest values 122.

The user interest values 122 may be used such as to control output of the digital content 112 to the client device 106 based on a user of the client device 106. To do so, a content targeting system 124 uses the user interest values 122 to identify users with interests corresponding to particular items of the digital content 112. This may include, for instance, the content targeting system 124 selecting a particular email to send from among a set of possible emails, determining a particular advertisement to serve to the client device 106, recommending a particular item of content to the user of the client device 106, and so forth.

As another example, the content targeting system 124 may display a user interface to allow a user of the content interest system 104 to view the user interest values 122, and manually select content to output to the client device 106. Although the digital content 112 is illustrated as maintained by the service provider system 102, this content may also be maintained and managed by the content interest system 104, the client device 106, and so forth. Further, the user interest values 122 may be used in implementations to guide generation or presentation of the digital content 112. For instance, the content targeting system 124 uses the user interest values 122 to identify a user's interests and outputs the interests for use in creating new digital content 112 that aligns with the identified interests.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
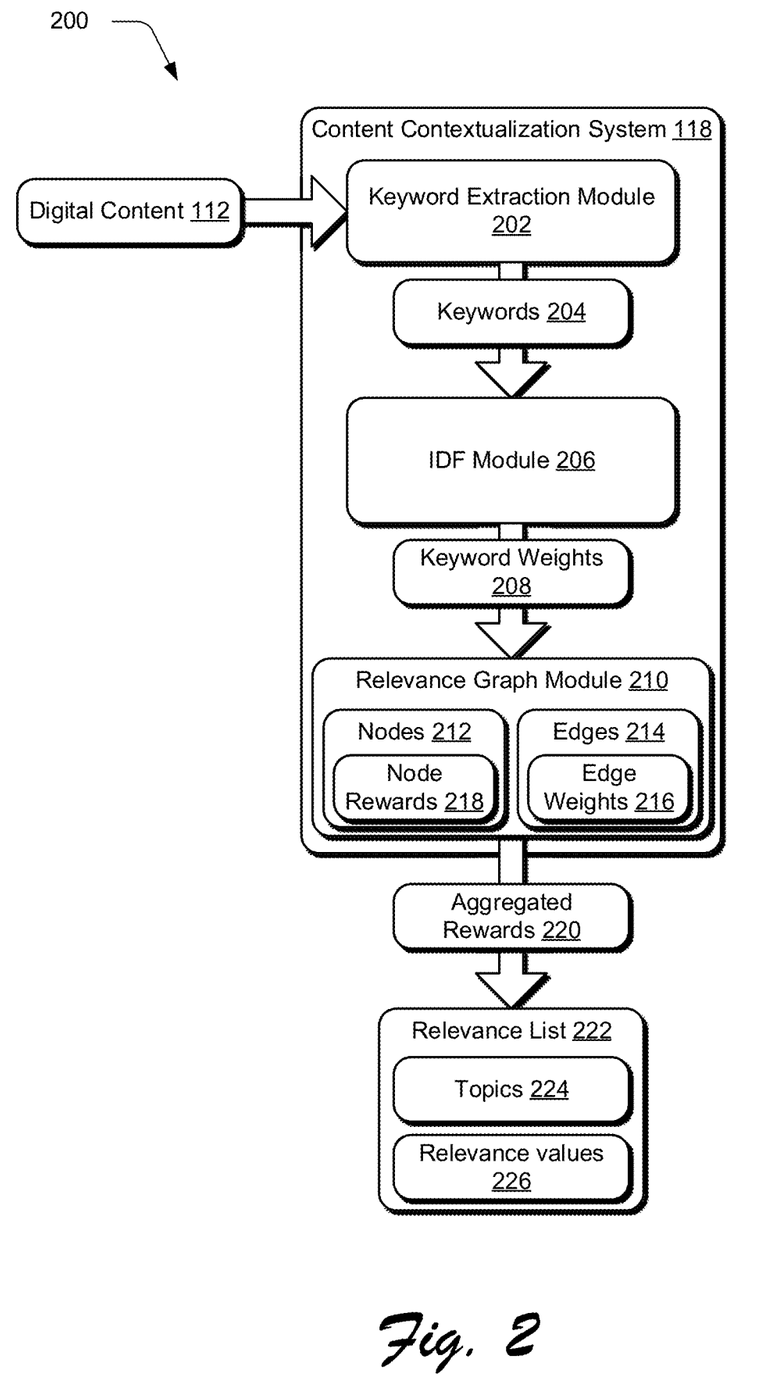
FIG. 2 depicts a system in an example implementation showing operation of an example content contextualization system for generating relevance values.

FIG. 2 depicts a system 200 showing an example content contextualization processing pipeline of the content contextualization system 118 of FIG. 1 in greater detail. The content contextualization processing pipeline begins by a keyword extraction module 202 extracting a set of keywords 204 from the digital content 112. The keyword extraction module 202 may, for instance, perform tokenization on the digital content 112 to break text into a list of individual words or tokens. The digital content 112 may be preprocessed, for instance, with techniques to break compound words into individual constituent words, remove words that lack significance as keywords (e.g., 'a', 'an', 'the', and so forth), convert words into a singular base or root form (e.g., "producing" or "produces" into "produce"), and so forth. The keyword extraction module 202 extracts the keywords 204 such as through key phrases, n-grams (e.g., 2-grams or 3-grams), entities present in the text, and so forth.

The keywords 204 are processed by an inverse document frequency (IDF) module 206 to generate keyword weights 208 indicative of statistical significance of the keywords 204 with respect to the digital content 112. The IDF module 206 includes a dictionary having a score for each popular word of a language. The score describes how common a particular word is within the language, such that commonly used words have a low score while infrequently used words have high scores. For example, the word 'food' in English has a lower score than the word 'sustenance' due to statistical usage frequency of those respective words within the English language. Thus, the IDF module 206 generates a keyword weight 208 for each respective keyword 204 based on a corresponding IDF score. The keyword weight 208 may incorporate, for instance, a frequency of the keyword 204 within the digital content 112 in addition to the IDF score (e.g., by multiplying the IDF score with a count or frequency of the keyword 204 within the digital content 112 to create a Term Frequency—Inverse Document Frequency value, or TFIDF value).

A relevance graph module 210 of the content contextualization system creates a network representation (e.g., a network graph) with nodes 212 and edges 214, and can capture both statistical and semantic significance of the keywords 204 with respect to the digital content 112. A network graph may be defined as $G=(V, E, W)$, including a set of node objects V (i.e., the nodes 212), a set of edges E connecting nodes in V (i.e., the edges 214), and a set of edge weights W corresponding to the edges E (i.e., the edge weights 216). Each of the keywords 204 is associated with a respective node $v \in V$. The nodes V are initialized with respective rewards r (i.e., node rewards 218) corresponding to the keyword weights 208, thus capturing the statistical significance of the keywords with respect to the digital content 112.

To determine the edges 214 and the edge weights 216, the relevance graph module 210 determines a semantic similarity between word-level embeddings for respective pairs of the nodes 212. For instance, the relevance graph module 210 may utilize a word embedding model that is maintained as data to produce word vector representations for the words associated with the nodes 212. The word embedding model may be configured in a variety of ways, examples of which include a Word2Vec model, a Global Vectors for word representation (GloVe) model, or any other suitable word embedding model able to create vector representations of words. The word vectors are representations of text features that capture semantic meaning of the text features. For example, a single text vector may be a vector with one thousand or more dimensions, thereby capable of including significantly more information than is included in raw ASCII values corresponding to the text features. A word vector may describe a location within a vector space, and distance between word vectors in the vector space may indicate semantic similarity. The semantic similarity between word-level embeddings may be, for instance, a cosine similarity between the word-level embeddings for the keywords 204 associated with the pair of nodes 212.

The relevance graph module 210 draws the edges 214 between respective nodes 212 based on the determined semantic similarity for the respective nodes 212. In implementations, the relevance graph module 210 draws an edge 214 between a pair of respective nodes 212 if the semantic similarity exceeds a threshold amount σ. As an example, the relevance graph module 210 will draw an edge $e_{12}$ between nodes $v_1$ and $v_2$ if the semantic similarity between word-level embeddings associated with $v_1$ and $v_2$ is greater than the threshold σ, but does not draw any edge between nodes $v_2$ and $v_3$ if the semantic similarity between word-level embeddings associated with $v_2$ and $v_3$ is less than the threshold σ.

The relevance graph module 210 initializes each of the edges E (i.e., the edges 214) with corresponding edge weights W (i.e., the edge weights 216). In implementations, the edge weights W correspond to the semantic similarity between word-level embeddings. For instance, an edge weight $w_{ij}$ is assigned the value of the semantic similarity between word-level embeddings for the nodes $v_i$ and $v_j$ (e.g., a cosine similarity).

The relevance graph module 210 captures both statistical and semantic significance of the keywords 204 with respect to the digital content 112 by generating aggregated rewards 220 based on both the node rewards 218 and the edge weights 216. For example, the relevance graph module 210 may determine the aggregated reward 220 for a node $v_i$ as a combination of the node's own reward $r_i$ and the weighted reward values of all neighbors of the node $v_i$, such as with the following equation:

$$R_{v_i} = \frac{w_1 r_i + w_2 \sum_{v_j \in N_i} r_j w_{ij}}{w_1 + w_2}$$

where $R_{v_i}$ is the aggregated reward corresponding to a node $v_i$, $N_i$ is a set of neighboring nodes of $v_i$ and containing nodes $v_j$, $r_i$ is the node reward for the node $v_i$ (e.g., the node reward 218 corresponding to the node $v_i$), $r_j$ is the node reward for the node $v_j$ (e.g., the node reward 218 corresponding to the node $v_j$), $w_{ij}$ is the semantic similarity between $v_i$ and $v_j$ (e.g., the edge weight 216 corresponding to the nodes $v_i$ and $v_j$), and $w_1$ and $w_2$ are adjustable weights for setting the importance of the node's own reward and the importance of the weighted reward values of all neighbors. In this example, the statistical significance value for the node $v_i$ is represented as $r_i$, the semantic significance value for the node $v_i$ is represented as $\Sigma_{v_j \in N_i} r_j w_{ij}$, and the relevance value for the node $v_i$ is represented as $R_{v_i}$. It is to be appreciated that while a semantic similarity (e.g., $w_{ij}$) describes a value in relation to two respective nodes, the semantic significance describes a value in relation to a single node.

For nodes 212 with similar node rewards 218 (e.g., topics with similar occurrence frequencies), the edge weights 216 ensure that nodes 212 semantically similar to other nodes 212 are weighted more, providing a stronger indication of the digital content 112. For example, if the digital content 112 includes the words 'dog' and 'boat' once each, the keyword weights 208 and thus the node rewards 218 are likely similar for the nodes corresponding to 'dog' and 'boat'. Continuing with this example, the digital content 112 additionally includes the words 'canine' and 'puppy', but does not include any additional words with a semantic similarity to 'boat'. While 'dog' and 'boat' have similar statistical significance, the statistical significance on its own is not indicative of the digital content 112, as the word 'dog' has a greater semantic significance due to the additional inclusion of the words 'canine' and 'puppy'. In this way, the relevance graph module 210 utilizes a combination of statistical and semantic significance of a topic in determining the aggregated rewards 220.

For a particular item of digital content 112, the content contextualization system 118 may use the aggregated rewards 220 to generate a relevance list 222 that includes topics 224 and corresponding relevance values 226. For instance, the content contextualization system 118 may generate a relevance list 222 based on the aggregated rewards 220, the relevance list including the top n keywords 204 (e.g., top 10, top 50, top 100, and so forth) as the topics 224, and the corresponding aggregated rewards 220 as the relevance values 226.

Figure 3:
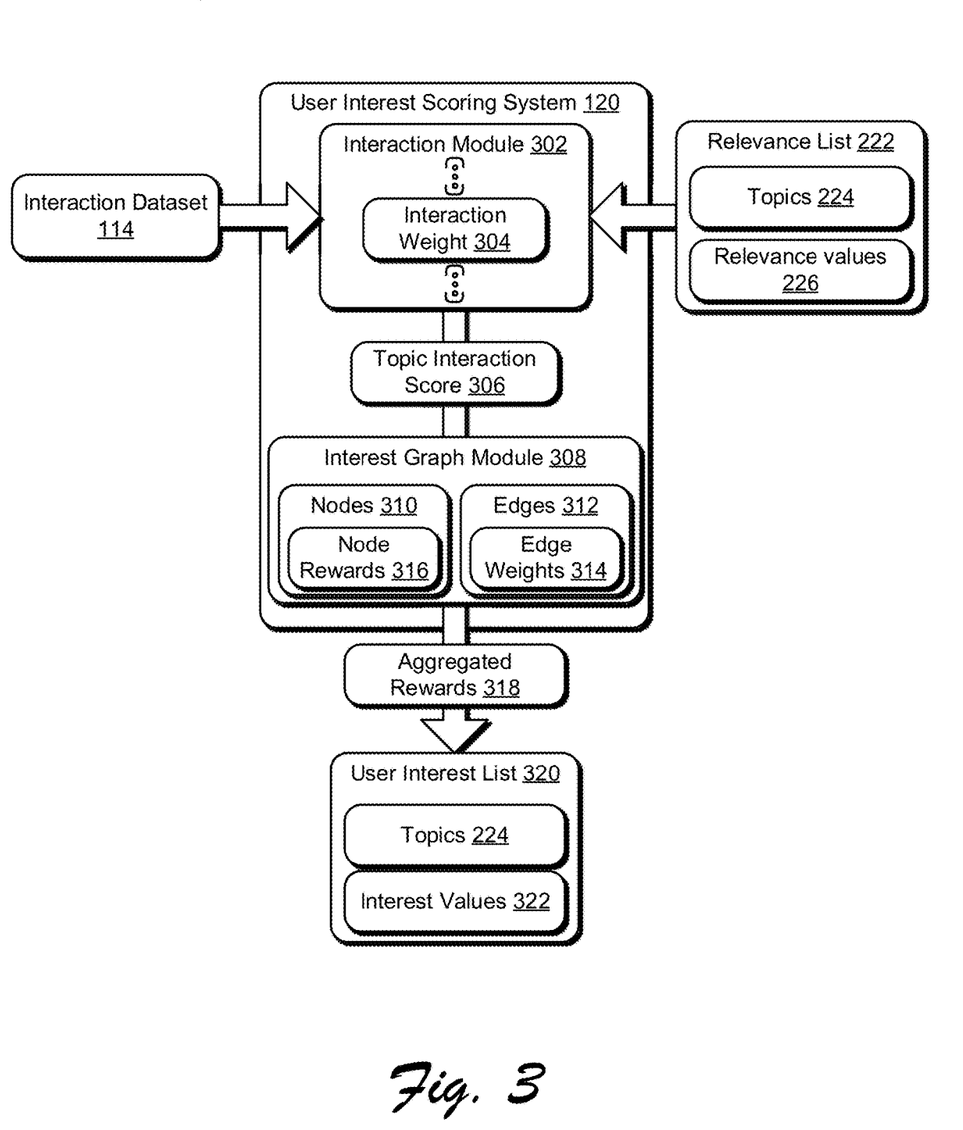
FIG. 3 depicts a system in an example implementation showing operation of an example user interest scoring system for generating interest values.

FIG. 3 depicts a system 300 showing an example user interest scoring processing pipeline of the user interest scoring system 120 of FIG. 1 in greater detail. The user interest scoring processing pipeline begins by an interaction module 302 extracting user interaction data for a particular user from the interaction dataset 114. For instance, the interaction dataset 114 may include a list of items of digital content 112 that were interacted with by a computing device associated with a particular user (e.g., based on an IP address associated with the user, an account identifier associated with the user, tracking cookies on a client device 106, and so forth). The interaction dataset may further include an indication of a type of interaction for each respective interaction.

The interaction module 302 defines an interaction weight 304 for each respective type of interaction. For instance, a view, click, sign-in, filling a form, and so forth may each be assigned a different respective interaction weight 304. Further, the interaction weights 304 may additionally incorporate a type of digital content that was interacted with, for example a view of an advertisement video may have a lower interaction weight 304 than a view of an instructional video, which in turn may have a lower interaction weight 304 than a view of a webinar.

For each interaction described by the interaction dataset 114, the interaction module 302 generates a topic interaction score 306 that is a weighted average representing an importance of the interaction for the user with respect to the topics 224. The interaction module 302 identifies, for a particular interaction in the interaction dataset 114, an item of digital content 112 and its corresponding relevance list 222 that has been generated by the content contextualization system 118 as described with respect to FIG. 2. For each respective topic 224, the interaction module 302 generates interaction scores by combining the respective relevance value 226 with the interaction weight 304 for a particular interaction. The interaction module 302 generates a topic interaction score 306 for each respective topic 224 that represents the user's interest in the respective topic. To do so, the interaction module 302 collates the topics extracted from the digital content 112 and assigns an aggregated weight to each topic. For example, the interaction module 302 may utilize the following equation:

$$S_t = \frac{\sum_{interaction} R_t^{interaction} w_i^{interaction}}{\sum_{interaction} w_i^{interaction}}$$

where $S_t$ is the topic interaction score 306 for a particular topic t, i indicates a type of interaction, $R_t^{interaction}$ is the relevance value 226 for the topic t with respect to the particular interaction, and $w_i^{interaction}$ is the interaction weight 304 for the interaction type i for the particular interaction. This aggregation combines the relevance of a topic based on the interaction pattern with the user across multiple interactions with the user.

An interest graph module 308 of the user interest scoring system creates a network representation (e.g., a network graph) with nodes 310 and edges 312, and captures both statistical and semantic significance of the topics 224 with respect to the user. The interest network graph may network graph may be defined as G=(V, E, W), including a set of node objects V (i.e., the nodes 310), a set of edges E connecting nodes in V (i.e., the edges 312), and a set of edge weights W corresponding to the edges E (i.e., edge weights 314). Each of the topics 224 is associated with a respective node v ∈V. The nodes V are initialized with respective node rewards 316 (i.e., the topic interaction scores 306, $S_t$) corresponding to the topics 224.

To determine the edges 312 and the edge weights 314, the interest graph module 308 determines a semantic similarity between word-level embeddings for respective pairs of the nodes 310. For instance, the interest graph module 308 may utilize a word embedding model that is maintained as data to produce word vector representations for the words associated with the nodes 310. The word embedding model may be configured in a variety of ways, examples of which include a Word2Vec model, a Global Vectors for word representation (GloVe) model, or any other suitable word embedding model able to create vector representations of words. The word vectors are representations of text features that capture semantic meaning of the text features. For example, a single text vector may be a vector with one thousand or more dimensions, thereby capable of including significantly more information than is included in raw ASCII values corresponding to the text features. A word vector may describe a location within a vector space, and distance between word vectors in the vector space may indicate semantic similarity. The semantic similarity between word-level embeddings may be, for instance, a cosine similarity between the word-level embeddings for the topics 224 associated with the pair of nodes 310.

The interest graph module 308 draws the edges 312 between respective nodes 310 based on the determined semantic similarity for the respective nodes 310. In implementations, the interest graph module 308 draws an edge 312 between a pair of respective nodes 310 if the semantic similarity exceeds a threshold amount σ. As an example, the interest graph module 308 will draw an edge $e_{12}$ between nodes $v_1$ and $v_2$ if the similarity between word-level embeddings of the topics associated with $v_1$ and $v_2$ is greater than the threshold σ, but does not draw any edge between nodes $v_2$ and $v_3$ if the similar between word-level embeddings of the topics associated with $v_2$ and $v_3$ is less than the threshold σ.

The interest graph module 308 initializes each of the edges E (i.e., the edges 312) with corresponding edge weights W (i.e., the edge weights 314). In implementations, the edge weights W correspond to the similarity between word-level embeddings of the respective topics. For instance, an edge weight $w_{ij}$ is assigned the value of the similarity between word-level embeddings for the topics associated with the nodes $v_i$ and $v_j$.

The interest graph module 308 captures both statistical and semantic significance of the topics 224 with respect to a particular user by generating aggregated rewards 318 for the nodes 310 based on both the node rewards 316 and the edge weights 314. For example, the interest graph module 308 may determine the aggregated rewards 318 for a node $v_i$ as a combination of the node's own reward $r_i$ and the weighted reward values of all neighbors of the node $v_i$, such as with the following equation:

$$R_{v_i} = \frac{w_1 r_i + w_2 \sum_{v_j \in N_i} r_j w_{ij}}{w_1 + w_2}$$

where $R_{v_i}$ is the aggregated reward corresponding to a node $v_i$, $N_i$ is a set of neighboring nodes of $v_i$ and containing nodes $v_j$, $r_i$ is the node reward for the node $v_i$ (e.g., the node reward 316 corresponding to the node $v_i$; the topic interaction score 306 for the node $v_i$), $r_j$ is the node reward for the node $v_j$ (e.g., the node reward 316 corresponding to the node $v_j$; the topic interaction score 306 for the node $v_j$), $w_{ij}$ is the semantic similarity between $v_i$ and $v_j$ (e.g., the edge weight 314 corresponding to the nodes $v_i$ and $v_j$), and $w_1$ and $w_2$ are adjustable weights for setting the importance of the node's own reward and the importance of the weighted reward values of all neighbors. In this example, the interaction score for the node $v_i$ is represented as $r_i$, the semantic significance value for the node $v_i$ is represented as $\sum_{v_j \in N_i} r_j w_{ij}$, and the interest value for the node $v_i$ is represented as $R_{v_i}$.

For nodes 310 with similar node rewards 316 (e.g., topics with similar occurrence frequencies), the edge weights 314 ensure that nodes 310 semantically similar to other nodes 310 are weighted more, providing a stronger indication of the digital content 112. In this way, the interest graph module 308 utilizes a combination of statistical importance and semantic significance of a topic in determining the aggregated rewards 318.

The user interest scoring system 120 generates a user interest list 320 that includes the topics 224 and interest values 322 (e.g., corresponding to the aggregated rewards 318). The user interest list 320 represents the relevance, significance, or importance of topics to the user, and in some implementations includes a ranked list of $\{<v_i, R_{v_i}>\}$ tuples. The user interest list 320 may be stored, for instance, in a storage device within the content interest system 104 such that each user is associated with a number of topics each having an interest score for the respective user.

Figure 4:
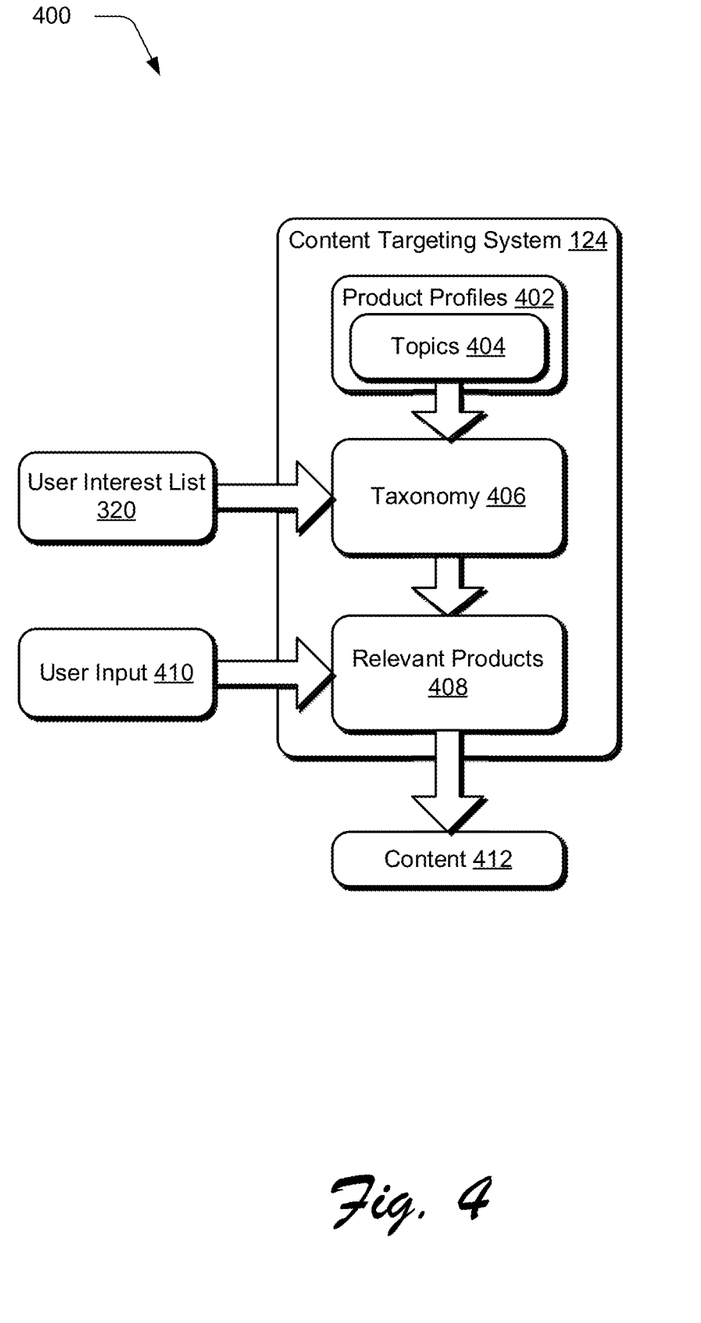
FIG. 4 depicts a system in an example implementation showing operation of an example content targeting system for controlling output of content.

FIG. 4 depicts a system 400 showing an example content targeting processing pipeline of the content targeting system 124 of FIG. 1 in greater detail. The content targeting processing pipeline begins by generating product profiles 402 that incorporate topics 404. For example, a user of the content targeting system 124 may create the a product profile 402 by manually selecting topics 404 that relate to a particular product based on the user's knowledge of the particular product. As another example, the content targeting system 124 may automatically generate a product profile 402, such as by using digital content associated with the particular product as an input to the content contextualization system 118 in order to generate the topics 404.

A taxonomy 406 is defined that provides a structured classification scheme for topics. For instance, various topics are mapped to nodes of the taxonomy 406, such as the topics 404, the topics 224, and so forth. In this way, the topics included in the user interest list 320 may be determined to correspond to respective ones of the topics 404, even if a direct match does not exist between the topics 404 and the topics included in the user interest list 320. The taxonomy 406 may be manually defined by a user of the content targeting system 124, may be automatically be generated by the content targeting system 124, or may utilize a pre-existing taxonomy.

The content targeting system 124 utilizes the product profiles 402 and the taxonomy 406 to identify relevant products 408 with respect to a user based on the user interest list 320 corresponding to the user. For instance, the content targeting system 124 identifies topics relevant to the user based on the user interest list 320, and compares these topics to the topics 404 based on the taxonomy 406. The content targeting system 124 locates a product profile 402 that includes similar or matching topics, and identifies a product corresponding to the product profile 402. Thus, based on the user interest list 320 and the product profiles 402, a user's interest in the product may be determined, and the identified product is determined to be a relevant product 408.

As an example, a user of the content targeting system 124 may select a particular user within a user interface (e.g., from a list of known users, from a list of entities corresponding to respective user interest lists 320, from a list of e-mail contacts, and so forth). Based on the selection, the content targeting system 124 locates a user interest list 320 corresponding to the particular user, and identifies relevant products 408 based on the user interest list 320. Further, the user may be defined as an entity at various levels of granularity, for example at an individual level, a company level, a region level, an entire audience, and so forth. In scenarios involving a level of granularity exceeding a single individual, the user interest list may incorporate a plurality of user interest lists 320 corresponding to the various individuals involved. For example, user interest list at a company level may incorporate information from each user interest list 320 that exists for individuals within the company.

The relevant products 408 may be utilized in determining or generating content 412 in various manners. For instance, the content 412 may include reports generated for consumption by a user of the content targeting system 124, may include promotional materials selected for distribution to a user, may identify or include items of the digital content 112 of FIG. 1, and so forth. As an example, the content targeting system 124 may in response to a user input 410 locate content 412 that includes promotional or marketing materials corresponding to a relevant product 408, and the content targeting system 124 may output the content 412 to a computing device associated with the user, or may output the content 412 to the user of the content targeting system 124 for further evaluation or curation as part of preparing a communication to the user.

As another example, the content targeting system 124 may generate content 412 that includes reports generated for consumption by a user of the content targeting system 124, such as reports analyzing a particular user's interest in various products, reports analyzing various users with respect to a particular product, reports identifying users as part of a target audience based on the user interest list 320, reports identifying users as part of a target audience interested in a particular product or set of products, reports identifying users as part of a target audience interest in a particular topic or set of topics, reports identifying users as part of a target audience that has interacted with content associated with a particular topic or product (for instance, with an interaction within a past number of days), and so forth. The user input 410, for instance, may determine the type of report that is generated.

These reports provide a user of the content targeting system 124 with various insights. For particular assets (e.g., items of the digital content 112), insights may be provided with respect to what an asset is conveying, such as by providing a list of topics that the asset relates to (e.g., the topics 224). For particular users, insights may be provided with respect to interest in various product lines along with top factors contributing to scores indicating interest, and may help users of the content targeting system 124 understand motivations of the user and personalize future content or communications with respect to the user. For a user representing an entity at an account or company level, insights may be provided with respect to what topics or products the account as a whole is interested in, which individuals within the account or company are interested in particular products, and so forth. For an audience, insights may be provided with respect to trending topics or products as a whole.

Figure 5:
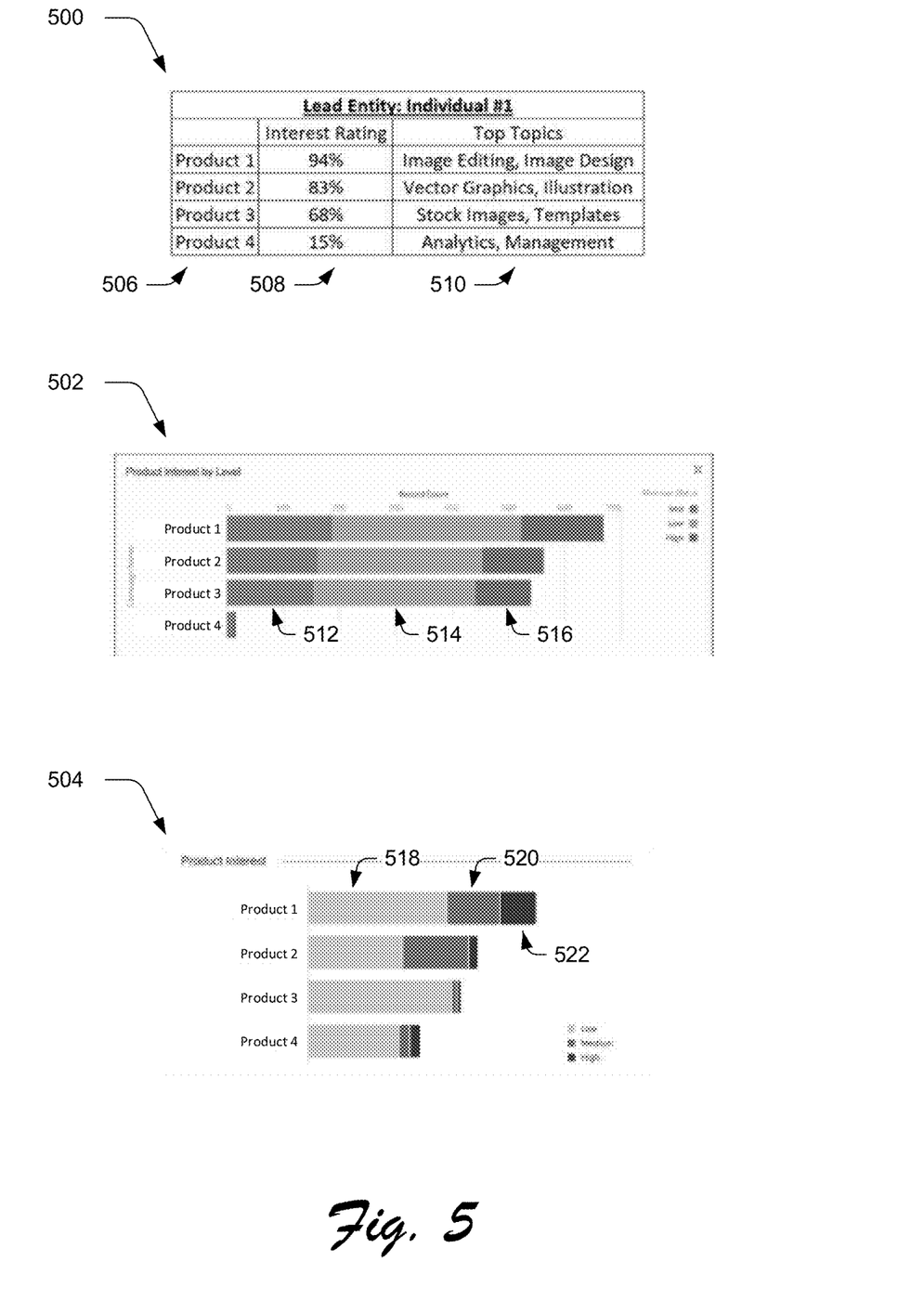
FIG. 5 depicts example graphical user interfaces used in conjunction with a content targeting system.

FIG. 5 depicts example graphical user interfaces 500, 502, and 504 for use in conjunction with the content targeting system 124. In this example, a user of the content targeting system 124 has generated the user input 410 of FIG. 4, and the content targeting system 124 has generated the content 412 of FIG. 4.

The example graphical user interface 500 shows content 412 generated as a report pertaining to a particular user. In this example, the content targeting system 124 has identified four relevant products 408 and assigned each of the relevant products an interest score specific to the particular user. Further, the content targeting system 124 has identified the most relevant topics with respect to each of the products with respect to the particular user. As illustrated, the example graphical user interface 500 displays the names of the respective products in a first column 506, the interest ratings for the respective products in a second column 508, and a subset of relevant topics associated with the respective products in a third column 510. In this way, a user of the content targeting system 124 is informed not only of the products that a user is interested in, but also a degree of interest and reasons why the user is interested in the products.

The example graphical user interface 502 shows content 412 generated as a report pertaining to a particular company or other organizational entity including a plurality of individuals. In this example, the content targeting system 124 has identified four relevant products 408 with respect to the particular company. For each individual entity within the particular company, the content targeting system 124 has assigned an interest level rating (e.g., low, medium, or high) for each respective product. The example graphical user interface 502 displays a bar graph indicating the interest levels for the various products across the particular company. For instance, the example graphical user interface 502 displays, with respect to 'Product 3', an indication 512 of a number of individuals in the company that have a medium level of interest in 'Product 3', an indication 514 of a number of individuals in the company that have a low level of interest in 'Product 3', and an indication 516 of a number of individuals in the company that have a high level of interest in 'Product 3'. In this way, a user of the content targeting system 124 can easily determine levels of interest in various products at a company or organization level. The example graphical user interface may be further configured, for instance, to display a list of individuals pertaining to each level of interest in a product (e.g., a list of individuals with a high level of interest in 'Product 3' that correspond to the indication 516).

The example graphical user interface 504 shows content 412 generated as a report pertaining to a general audience base including a plurality of individuals. In this example, the content targeting system 124 (or a user of the content targeting system 124) has selected four products. For each individual entity for which the content targeting system 124 has data (e.g., for entities corresponding to a user interest list 320 of FIG. 3), the content targeting system 124 has assigned an interest level rating (e.g., low, medium, or high) for each respective one of the products. The example graphical user interface 504 displays a bar graph indicating the interest levels for the products across an entire audience. For instance, the example graphical user interface 502 displays, with respect to 'Product 1', an indication 518 of a number of individuals in the audience that have a low level of interest in 'Product 1', an indication 520 of a number of individuals in the audience that have a medium level of interest in 'Product 1', and an indication 522 of a number of individuals in the audience that have a high level of interest in 'Product 1'. In this way, a user of the content targeting system 124 can easily determine levels of interest in various products across an entire audience.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
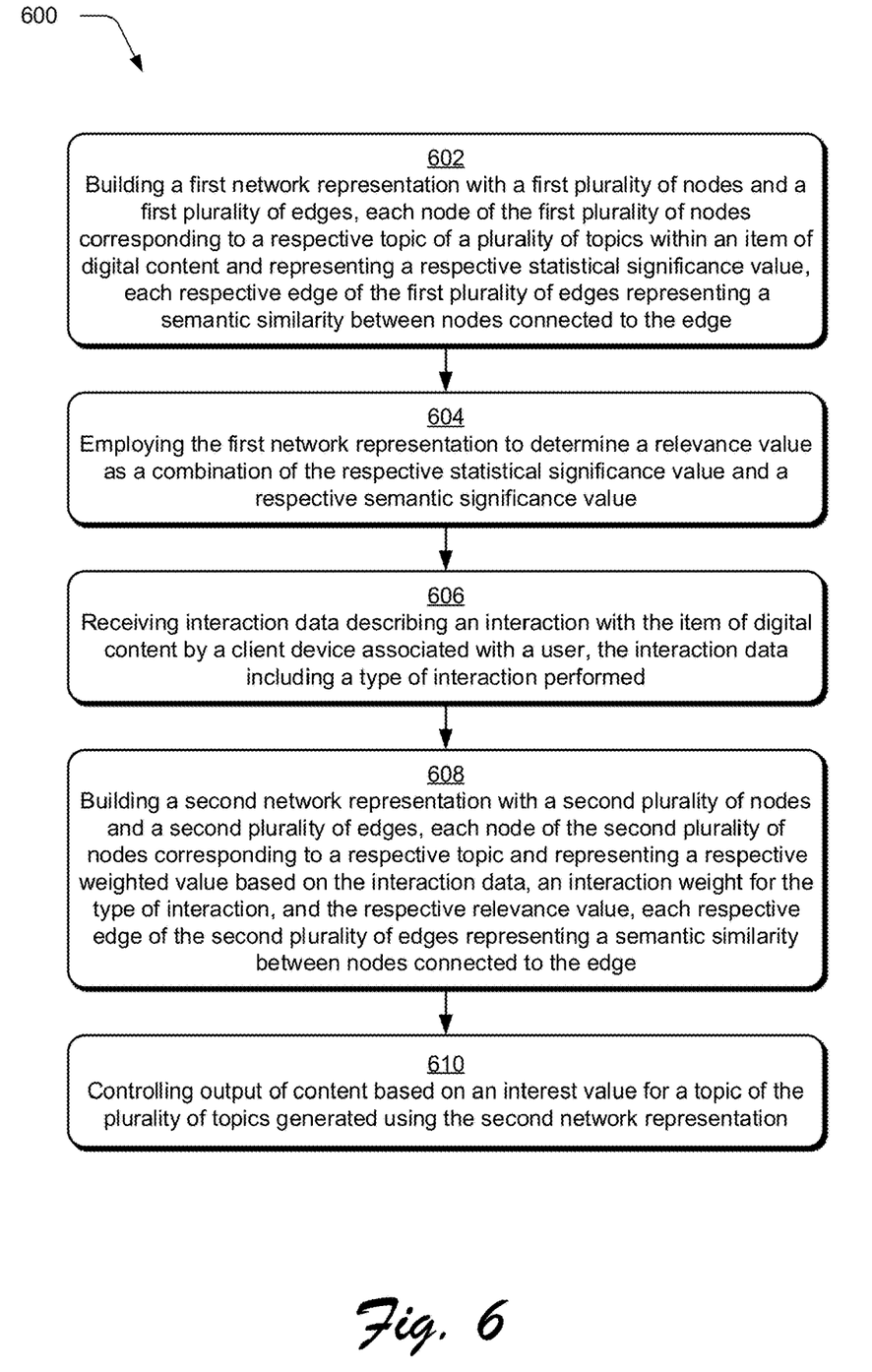
FIG. 6 is a flow diagram depicting a procedure in an example implementation of content interest from interaction information techniques.

FIG. 6 depicts a procedure 600 in an example implementation in which user interest values are generated and utilized as part of a content interest technique to control output of content by a content interest system. A first network representation is built that has a first plurality of nodes and a first plurality of edges, each node of the first plurality of nodes corresponding to a respective topic of a plurality of topics within an item of digital content and representing a respective statistical significance value, each respective edge of the first plurality of edges representing a semantic similarity between nodes connected to the edge (block 602). This may be performed, for example, by the relevance graph module 210 of FIG. 2. Each of the nodes may be initialized with a value corresponding to a statistical significance value for a corresponding topic. The statistical significance value may be determined, for instance, by extracting a set of keywords from the item of digital content, processing the keywords with an IDF technique, and multiplying the IDF value for each respective keyword with a term frequency for the keyword within the item of digital content to create a TFIDF value. The statistical significance values may be, for instance, the keyword weights 208 of FIG. 2, incorporated as the node rewards 218 for the nodes 212 of FIG. 2. The semantic similarity between nodes may be, for instance, a similarity between word-level embeddings for nodes representing a semantic similarity between the word-level embeddings within a language.

A relevance value is determined for each respective one of the plurality of topics as a combination of the respective statistical significance value and a respective semantic significance value by employing the first network representation (block 604). The semantic significance value for a node, for instance, incorporates the semantic similarities between the node and other nodes in conjunction with the statistical significance values for the other nodes. For example, the semantic significance value for a node may be determined as a weighted sum of the statistical significance values for the other nodes (not including the statistical significance value for the node) with each statistical significance value weighted according to a semantic similarity with respect to the node. Thus, the relevance value for a topic captures both the statistical and semantic significance of the topic.

Interaction data is received that describes an interaction with the item of digital content by a client device associated with a user, the interaction data including a type of interaction performed (block 606). The interaction data, for instance, identifies a plurality of items of digital content that a user has interacted with, and describes the particular interactions that took place. For example, the interaction data may specify that a user accessed a first webpage, filled a form on the first webpage, and viewed a video on a second webpage. In this example, each of these interactions is separately indicated within the interaction data.

A second network representation is built that has a second plurality of nodes and a second plurality of edges, each node of the second plurality of nodes corresponding to a respective topic and representing a respective weighted value based on the interaction data, an interaction weight for the type of interaction, and the respective relevance value, each respective edge of the second plurality of edges representing a semantic similarity between nodes connected to the edge (block 608). This may be performed, for example, by the interest graph module 308 of FIG. 3. Each of the nodes may be initialized with a weighted value representing a user's interest in a respective topic, such as by weighting relevance values with the interaction weight to create interaction scores and generate aggregated weights for each topic. Furthering the above example, a relevance list is located for each of the first webpage and the second webpage. Based on the interactions with these webpages, interest values are determined that combine the relevance values for a webpage with the user's interest in the webpage, resulting in interest values for various topics. For example, interaction weights are applied to the user accessing the first webpage and filling a form on the first webpage, and these weights are combined with the relevance values for the first webpage; further, an interaction weight is applied to the user viewing a video on the second webpage, and this weight is combined with the relevance values for the second webpages. The user's weighted interest or interaction scores in a topic across the first and second webpages are combined into a single interest value for the topic. The semantic similarity between nodes may be, for instance, a similarity between word-level embeddings for nodes representing a similarity between the word-level embeddings within a language.

Output of content is controlled based on an interest value for a topic of the plurality of topics generated using the second network representation (block 610). The semantic similarities between the node and other nodes, for instance, may be combined with the weighted values for the other nodes from block 608 and used in conjunction with the weighted value for the node from block 608 in order to determine the interest value for a node. As described with respect to FIGS. 4 and 5, the interest values are utilized to determine relevant products with respect to a user. Insights are harvested from these relevant products, and content may be generated, selected, or communicated based on the identified relevant products in order to tailor communications for delivery to a user based on a user's own interests. As an example, the content targeting system 124 of FIG. 1 may generate reports for consumption by a user of the content targeting system 124, which analyze a user's interest in various products, and so forth.

Example System and Device

Figure 7:
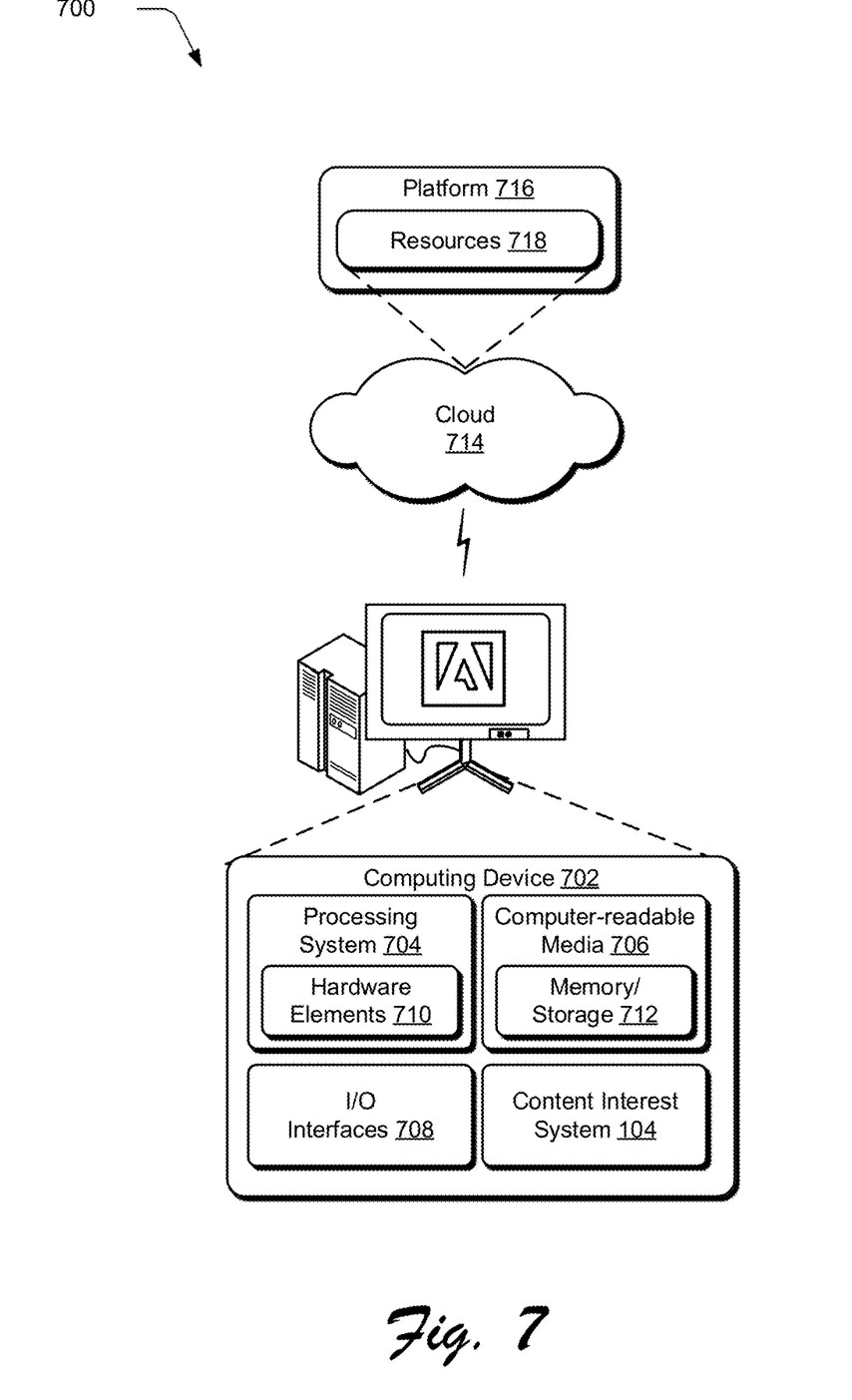
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the content interest system 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for delivering content interest, a method implemented by at least one computing device, the method comprising:
building, by the at least one computing device, a first network representation with a first plurality of nodes and a first plurality of edges, each node of the first plurality of nodes corresponding to a respective topic of a plurality of topics within an item of digital content and representing a respective statistical significance value, each respective edge of the first plurality of edges representing a semantic similarity between nodes connected to the edge;
employing, by the at least one computing device, the first network representation to determine for each respective one of the plurality of topics a relevance value as a combination of the respective statistical significance value and a respective semantic significance value;
receiving, by the at least one computing device, interaction data describing an interaction with the item of digital content by a client device associated with a user, the interaction data including a type of interaction performed;
building, by the at least one computing device, a second network representation with a second plurality of nodes and a second plurality of edges, each node of the second plurality of nodes corresponding to a respective topic and representing a respective weighted value based on the interaction data, an interaction weight for the type of interaction, and the respective relevance value, each respective edge of the second plurality of edges representing a semantic similarity between nodes connected to the edge;
controlling, by the at least one computing device, output of content based on an interest value for a topic of the plurality of topics generated using the second network representation.

2. The method of claim 1, wherein the determining the statistical significance value for each of the plurality of topics includes extracting keywords from the item of digital content and assigning a weighted value to each respective keyword based on an inverse document frequency value for the respective keyword.

3. The method of claim 1, wherein an edge connecting a respective pair of the nodes is created if the semantic similarity between the respective topics associated with the pair of nodes exceeds a threshold value.

4. The method of claim 1, wherein a semantic significance value for a node is based on respective statistical significance values for each node neighboring the node.

5. The method of claim 1, wherein a semantic significance value for a node is based on respective statistical significance values for each node neighboring the node and semantic similarities with respect to each node neighboring the node.

6. The method of claim 1, wherein the interaction data describes a plurality of interactions associated with the user and a respective type of interaction performed for each respective interaction, and wherein the interest value is based on respective interaction weights for each respective type of interaction.

7. The method of claim 1, wherein each respective node of the second plurality of nodes corresponds to an interaction score based on the interaction data, the interaction weight for the type of interaction, and the relevance values.

8. The method of claim 1, wherein a respective weighted value is determined by, for each of a plurality of interactions described in the interaction data, identifying a topic associated with the interaction and weighting a relevance value for the topic with the interaction weight for the type of interaction, and aggregating the weighted relevance values for the topic.

9. The method of claim 1, wherein the controlling includes comparing the interest value with a value describing the importance of the topic with respect to the content.

10. The method of claim 1, wherein the controlling includes comparing the interest value with a value describing the importance of the topic with respect to a product, and wherein the content is associated with the product.

11. In a digital medium environment for delivering content interest, a system comprising:
a content contextualization system implemented at least partially in hardware of at least one computing device to:
build a first network representation with a first plurality of nodes and a first plurality of edges, each node of the first plurality of nodes corresponding to a respective topic of a plurality of topics within an item of digital content and representing a respective statistical significance value, each respective edge of the first plurality of edges representing a semantic similarity between nodes connected to the edge; and
employ the first network representation to determine for each respective one of the plurality of topics a relevance value as a combination of the respective statistical significance value and a respective semantic significance value;
a user interest scoring system implemented at least partially in the hardware of the at least one computing device to:
receive interaction data describing an interaction with the item of digital content by a client device associated with a user, the interaction data including a type of interaction performed; and
build a second network representation with a second plurality of nodes and a second plurality of edges, each node of the second plurality of nodes corresponding to a respective topic and representing a respective weighted value based on the interaction data, an interaction weight for the type of interaction, and the respective relevance value, each respective edge of the second plurality of edges representing a semantic similarity between nodes connected to the edge; and
a content targeting system implemented at least partially in hardware of the at least one computing device to control output of content based on an interest value for a topic of the plurality of topics generated using the second network representation.

12. The system of claim 11, wherein the determining the statistical significance value for each of the plurality of topics includes extracting keywords from the item of digital content and assigning a weighted value to each respective keyword based on an inverse document frequency value for the respective keyword.

13. The system of claim 11, wherein an edge connecting a respective pair of the nodes is created if the semantic similarity between the respective topics associated with the pair of nodes exceeds a threshold value.

14. The system of claim 11, wherein a semantic significance value for a node is based on respective statistical significance values for each node neighboring the node.

15. The system of claim 11, wherein a semantic significance value for a node is based on respective statistical significance values for each node neighboring the node and semantic similarities with respect to each node neighboring the node.

16. The system of claim 11, wherein the interaction data describes a plurality of interactions associated with the user and a respective type of interaction performed for each respective interaction, and wherein the interest value is based on respective interaction weights for each respective type of interaction.

17. The system of claim 11, wherein each respective node of the second plurality of nodes corresponds to an interaction score based on the interaction data, the interaction weight for the type of interaction, and the relevance values.

18. In a digital medium environment for delivering content interest, a system comprising:
means for building a first network representation with a first plurality of nodes and a first plurality of edges, each node of the first plurality of nodes corresponding to a respective topic of a plurality of topics within an item of digital content and representing a respective statistical significance value, each respective edge of the first plurality of edges representing a semantic similarity between nodes connected to the edge;
means for employing the first network representation to determine for each respective one of the plurality of topics a relevance value as a combination of the respective statistical significance value and a respective semantic significance value;
means for receiving interaction data describing an interaction with the item of digital content by a client device associated with a user, the interaction data including a type of interaction performed;
means for building a second network representation with a second plurality of nodes and a second plurality of edges, each node of the second plurality of nodes corresponding to a respective topic and representing a respective weighted value based on the interaction data, an interaction weight for the type of interaction, and the respective relevance value, each respective edge of the second plurality of edges representing a semantic similarity between nodes connected to the edge;
means for controlling output of content based on an interest value for a topic of the plurality of topics generated using the second network representation.

19. The system of claim 18, wherein the means for building the first network representation includes means for extracting keywords from the item of digital content and means for assigning a weighted value to each respective keyword based on an inverse document frequency value for the respective keyword.

20. The system of claim 19, wherein the means for building the first network representation includes means for connecting respective pairs of nodes with edges if the semantic similarity between the respective topics associated with the pair of nodes exceeds a threshold value.

* * * * *